United States Patent
Fukuda et al.

(10) Patent No.: US 9,221,968 B2
(45) Date of Patent: Dec. 29, 2015

(54) CURABLE PERFLUOROPOLYETHER BASED GEL COMPOSITION AND GEL PRODUCT USING CURED COMPOSITION

(71) Applicant: Shin-Etsu Chemical Co., Ltd., Tokyo (JP)

(72) Inventors: Kenichi Fukuda, Annaka (JP); Mitsuo Muto, Annaka (JP); Mikio Shiono, Annaka (JP)

(73) Assignee: Shin-Etsu Chemical Co., Ltd., Chiyoda-ku (JP)

( * ) Notice: Subject to any disclaimer, the term of this patent is extended or adjusted under 35 U.S.C. 154(b) by 0 days.

(21) Appl. No.: 14/666,698

(22) Filed: Mar. 24, 2015

(65) Prior Publication Data

US 2015/0274960 A1    Oct. 1, 2015

(30) Foreign Application Priority Data

Mar. 31, 2014    (JP) ................................. 2014-074342

(51) Int. Cl.
| | |
|---|---|
| C08L 43/04 | (2006.01) |
| C08G 65/00 | (2006.01) |
| C08G 65/336 | (2006.01) |
| C08L 71/02 | (2006.01) |

(52) U.S. Cl.
CPC ............... *C08L 43/04* (2013.01); *C08G 65/007* (2013.01); *C08G 65/336* (2013.01); *C08L 71/02* (2013.01); *C08G 2650/48* (2013.01); *C08L 2201/02* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 5,665,846 | A | 9/1997 | Sato et al. | |
| 6,040,400 | A | 3/2000 | Fukuda et al. | |
| 6,979,710 | B2 * | 12/2005 | Osawa | C08G 65/007 524/588 |
| 7,067,688 | B2 * | 6/2006 | Koike | C07F 7/184 556/449 |
| 7,091,279 | B2 * | 8/2006 | Osawa | C08G 65/336 524/588 |
| 7,335,785 | B2 * | 2/2008 | Koike | C07C 67/14 556/482 |
| 7,718,723 | B2 * | 5/2010 | Sato | C08G 5/007 524/261 |
| 8,492,478 | B2 | 7/2013 | Fukuda et al. | |
| 2006/0160934 | A1 * | 7/2006 | Koshikawa | B60C 1/00 524/261 |
| 2006/0183859 | A1 * | 8/2006 | Fukuda | C08G 65/007 525/115 |
| 2006/0270791 | A1 * | 11/2006 | Kishita | C08G 77/46 524/861 |
| 2007/0100043 | A1 * | 5/2007 | Shiono | C08G 65/007 524/261 |
| 2008/0132653 | A1 * | 6/2008 | Shiono | C08G 65/005 525/478 |
| 2008/0289760 | A1 * | 11/2008 | Koshikawa | C08G 65/007 156/329 |
| 2009/0084602 | A1 * | 4/2009 | Fukuda | C08G 65/007 174/520 |
| 2009/0130318 | A1 * | 5/2009 | Shiono | C08J 5/122 427/379 |
| 2009/0258986 | A1 * | 10/2009 | Yamaguchi | C08G 5/007 524/442 |
| 2009/0284149 | A1 * | 11/2009 | Koshikawa | C08G 5/007 313/512 |
| 2011/0178263 | A1 * | 7/2011 | Koshikawa | C08G 65/007 528/15 |
| 2011/0257315 | A1 * | 10/2011 | Shiono | C08G 77/24 524/266 |
| 2014/0114041 | A1 * | 4/2014 | Muto | C08G 65/00 528/15 |

FOREIGN PATENT DOCUMENTS

| | | |
|---|---|---|
| EP | 1 605 018 A1 | 12/2005 |
| EP | 1 693 398 A1 | 8/2006 |
| EP | 2 043 147 A2 | 4/2009 |
| EP | 2 407 500 A1 | 1/2012 |
| JP | 8-199070 | 8/1996 |
| JP | 11-116685 | 4/1999 |
| JP | 2012-21074 | 2/2012 |
| JP | 2012-102187 | 5/2012 |

OTHER PUBLICATIONS

European Search Report dated Sep. 1, 2015 issued in corresponding European patent application No. 15161023.5.

* cited by examiner

*Primary Examiner* — Robert S Loewe
(74) *Attorney, Agent, or Firm* — Oblon, McClelland, Maier & Neustadt, L.L.P.

(57) ABSTRACT

A curable perfluoropolyether based gel composition is provided comprising (A) a linear fluorinated polymer containing at least two alkenyl groups, (B) a polyfluoromonoalkenyl compound containing one alkenyl group and having a perfluoropolyether structure in its backbone, (C) a cyclic organohydrogenpolysiloxane having at least two silicon-bonded hydrogen atoms and at least one perfluoroalkyl group or perfluoropolyether structure-containing group, and (D) a hydrosilylation reaction catalyst. The composition cures into a gel having improved acid resistance as well as heat resistance, solvent resistance, chemical resistance, weatherability, parting property, and water/oil repellency.

7 Claims, No Drawings

US 9,221,968 B2

CURABLE PERFLUOROPOLYETHER BASED GEL COMPOSITION AND GEL PRODUCT USING CURED COMPOSITION

CROSS-REFERENCE TO RELATED APPLICATION

This non-provisional application claims priority under 35 U.S.C. §119(a) on Patent Application No. 2014-074342 filed in Japan on Mar. 31, 2014, the entire contents of which are hereby incorporated by reference.

TECHNICAL FIELD

This invention relates to a curable perfluoropolyether based gel composition which cures into a gel having heat resistance, solvent resistance, chemical resistance, and improved acid resistance, and a gel product using the cured composition.

BACKGROUND ART

In the prior art, Patent Document 1 discloses a perfluoropolyether based gel composition comprising a linear perfluoropolyether compound containing at least two alkenyl groups per molecule and having a perfluoropolyether structure in its backbone, a linear perfluoropolyether compound containing one alkenyl group per molecule and having a perfluoropolyether structure in its backbone, an organosilicon compound having at least two hydrosilyl groups per molecule, and a hydrosilylation reaction catalyst. The composition cures into a gel having a good profile of heat resistance, chemical resistance, solvent resistance, water/oil repellency, and weatherability.

This perfluoropolyether based gel composition performs well in most applications. However, in some applications including sealing agents for use in semiconductor fabrication equipment, sealing and potting agents for use with engine oil, sealing and potting agents for use in engine exhaust system parts, not only chemical resistance, but also acid resistance is needed.

Patent Document 2 describes a polymer having a terminal structure in the form of [aromatic ring-silicon atom-vinyl group] structure. The polymer is fast curable owing to the [silicon atom-vinyl group] structure, the bond site between aromatic ring and silicon atom is known to be vulnerable to acid. On the other hand, polymers whose terminal structure is free of [aromatic ring-silicon atom-vinyl group] structure, for example, a polymer having a terminal structure in the form of [aromatic ring-alkylene group-vinyl group] structure and a polymer having a terminal structure in the form of [amide group having aromatic ring substituent group on side chain-alkylene group-vinyl group] structure (see Patent Documents 3 and 4) have good acid resistance, but lack fast cure. In terms of acid resistance, the polymers whose terminal structure is free of [aromatic ring-silicon atom-vinyl group] structure are good in resistance to sulfuric acid, but short in resistance to nitric acid. Since the engine exhaust system parts mentioned above are exposed to not only SOx, but also NOx in the exhaust gases, they must have high nitric acid resistance. It is thus desired to have a perfluoropolyether based gel composition having a good profile of oil resistance, chemical resistance, and acid resistance, specifically resistance to both sulfuric acid and nitric acid.

CITATION LIST

Patent Document 1: JP-A H11-116685 (U.S. Pat. No. 6,040,400)
Patent Document 2: JP-A H08-199070
Patent Document 3: JP-A 2012-102187
Patent Document 4: JP-A 2012-021074 (U.S. Pat. No. 8,492,478, EP 2407500)

DISCLOSURE OF INVENTION

An object of the invention is to provide a perfluoropolyether based gel composition which cures into a gel having heat resistance, solvent resistance, chemical resistance, weatherability, parting property, water/oil repellency, and in particular, improved acid resistance, specifically nitric acid resistance, and a gel product comprising the cured composition.

Making efforts to overcome the shortcomings of prior art perfluoropolyether based gel compositions, the inventors have reached a perfluoropolyether based gel composition comprising components (A) to (D) defined below.

In one aspect, the invention provides a curable perfluoropolyether based gel composition comprising (A) a linear fluorinated polymer containing at least two alkenyl groups per molecule, represented by the formula (1):

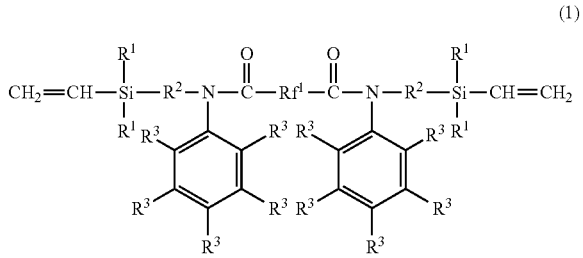

(1)

wherein $R^1$ is each independently vinyl or $C_1$-$C_4$ alkyl, $R^2$ is each independently $C_1$-$C_6$ alkylene, $R^3$ is each independently hydrogen or optionally fluorinated $C_1$-$C_4$ alkyl, and $Rf^1$ is a perfluoroalkylene group or divalent perfluoropolyether structure-containing group, (B) a polyfluoromonoalkenyl compound containing one alkenyl group per molecule and having a perfluoropolyether structure in its backbone, (C) a cyclic organohydrogenpolysiloxane having at least two silicon-bonded hydrogen atoms and at least one perfluoroalkyl group or perfluoropolyether structure-containing group per molecule, represented by the formula (2):

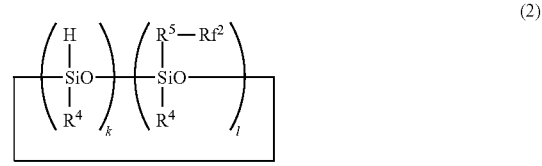

(2)

wherein $Rf^2$ is a perfluoroalkyl group or monovalent perfluoropolyether structure-containing group, $R^4$ is each independently a $C_1$-$C_{20}$ monovalent hydrocarbon group, $R^5$ is a $C_2$-$C_{20}$ divalent hydrocarbon group which may contain an ether bond, amide bond, carbonyl bond, silyl radical or ester bond, k is an integer of 2 to 4, l is an integer of 1 to 3, and k+l is 5, and (D) a hydrosilylation reaction catalyst.

In a preferred embodiment, component (C) is a hydrogenpolysiloxane of the following formula:

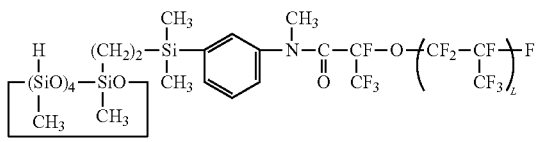

wherein L is an integer of 1 to 200.

In a preferred embodiment, the gel composition may further comprise (E) at least one perfluoropolyether compound selected from the general formulae (3) to (5):

$$A-O-(CF_2-CF_2-CF_2-O)_d-A \qquad (3)$$

wherein A is a group: $C_eF_{2e+1}-$, d is an integer of 1 to 500, e is an integer of 1 to 3, $$A-O-(CF_2-O)_f-(CF_2-CF_2-O)_h-A \qquad (4)$$

wherein A is as defined above, f and h each are an integer of 1 to 300,

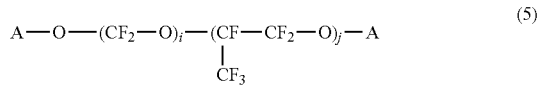

wherein A is as defined above, i and j each are an integer of 1 to 300.

In a preferred embodiment, the gel composition is cured into a gel mass having a penetration of 1 to 200 according to JIS K 2220 or ASTM D-1403.

In a preferred embodiment, the composition is cured into a gel mass that shows a residual solid content of at least 90% by weight after it is immersed in conc. sulfuric acid (98%) at 40° C. for 1,000 hours, and a penetration change of up to 25 after it is immersed in conc. nitric acid (60%) at 40° C. for 2,000 hours.

The invention also provides a gel product comprising a cured mass of the curable perfluoropolyether based gel composition defined above. The gel product is suited for use in automobiles, chemical plants, inkjet printers, semiconductor fabrication lines, analyzers, scientific instruments, medical instruments, aircraft, or fuel cells.

Advantageous Effects of Invention

The perfluoropolyether based gel composition of the invention cures into a gel (or cured mass) having heat resistance, solvent resistance, chemical resistance, weatherability, parting property, water/oil repellency, and in particular, improved acid resistance. A gel product comprising a cured mass of the composition is suited for use in automobiles, chemical plants, inkjet printers, semiconductor fabrication lines, analyzers, scientific instruments, medical instruments, aircraft, and fuel cells.

DESCRIPTION OF PREFERRED EMBODIMENTS

The notation (Cn-Cm) means a group containing from n to m carbon atoms per group. Me stands for methyl, Ph for phenyl, Ph' for phenylene, and Ar for aromatic ring.

Briefly, the curable perfluoropolyether based gel composition is defined as comprising (A) a linear fluorinated polymer containing at least two alkenyl groups per molecule, represented by formula (1), (B) a polyfluoromonoalkenyl compound containing one alkenyl group per molecule and having a perfluoropolyether structure in its backbone, (C) a cyclic organohydrogenpolysiloxane having at least two silicon-bonded hydrogen atoms and at least one perfluoroalkyl group or perfluoropolyether structure-containing group per molecule, represented by formula (2), and (D) a hydrosilylation reaction catalyst.

Component A

Component (A) is a linear fluorinated polymer containing at least two alkenyl groups per molecule and having a specific terminal structure which has a silicon atom-vinyl bond [Si-vinyl], but not an aromatic ring-silicon atom bond [Ar—Si], represented by the formula (1).

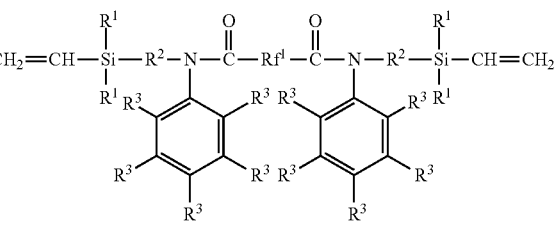

Herein $R^1$ is each independently vinyl or $C_1$-$C_4$ alkyl, $R^2$ is each independently $C_1$-$C_6$ alkylene, $R^3$ is each independently hydrogen or optionally fluorinated $C_1$-$C_4$ alkyl, and $Rf^1$ is a perfluoroalkylene group or divalent perfluoropolyether structure-containing group.

In formula (1), $R^1$ is each independently vinyl or $C_1$-$C_4$ alkyl. Suitable $C_1$-$C_4$ alkyl groups include methyl, ethyl, propyl, and butyl. Preferably $R^1$ is vinyl or methyl. $R^2$ is each independently a $C_1$-$C_6$, preferably $C_3$-$C_6$ alkylene group, examples of which include methylene, ethylene, propylene (trimethylene or methylethylene), butylene (tetramethylene or methylpropylene) and hexamethylene. $R^2$ is preferably ethylene or trimethylene. $R^3$ is each independently hydrogen or an optionally fluorinated $C_1$-$C_4$ alkyl group. Suitable $C_1$-$C_4$ alkyl groups are as exemplified above for $R^1$.

$Rf^1$ is a perfluoroalkylene group or divalent perfluoropolyether structure-containing group. The divalent perfluoropolyether structure-containing group is typically a linear or branched perfluoroalkylene group of 2 to 10 carbon atoms, preferably 2 to 6 carbon atoms. The divalent perfluoropolyether structure-containing group contains a multiplicity of repeating units of the formula:

—$C_gF_{2g}$O— wherein g is an integer of 1 to 6, and is represented, for example, by the formula (6):

$$-(C_gF_{2g}O)_x- \qquad (6)$$

wherein g is an integer of 1 to 6, and x is an integer of 20 to 600, preferably 30 to 400, and more preferably 30 to 200.

Examples of the repeating unit: —$C_gF_{2g}$O— are shown below.

—$CF_2$O—
—$CF_2CF_2$O—
—$CF_2CF_2CF_2$O—
—$CF(CF_3)CF_2$O—

—CF$_2$CF$_2$CF$_2$CF$_2$O—
—CF$_2$CF$_2$CF$_2$CF$_2$CF$_2$CF$_2$O—
—C(CF$_3$)$_2$O—

Of these, units of the formula: —CF$_2$O—, —CF$_2$CF$_2$O—, —CF$_2$CF$_2$CF$_2$O—, and —CF(CF$_3$)CF$_2$O— are preferred.

The divalent perfluoropolyether structure-containing group may be composed of repeating units of one type or a combination of two or more types.

Preferably the divalent perfluoropolyether structure-containing group contains a structure selected from structures of the following formulae (7) to (9).

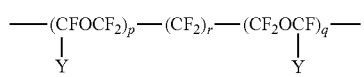  (7)

In formula (7), Y is fluorine or trifluoromethyl, p, q and r are integers in the range: p≥0, q≥0, 0≤p+q≤200, especially 2≤p+q≤150, and 0≤r≤6, exclusive of p=q=r=0.

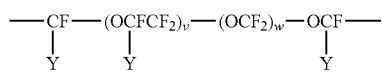  (8)

In formula (8), Y is fluorine or trifluoromethyl, each of v and w is an integer of 1 to 20.

—CF$_2$CF$_2$—(OCF$_2$CF$_2$CF$_2$)$_z$—OCF$_2$CF$_2$— (9)

In formula (9), z is an integer of 1 to 100.

Examples of Rf$^1$ in formula (1) are shown below.

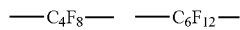

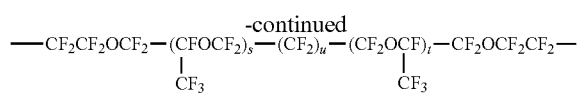

Herein, s, t and u are integers in the range: s≥0, t≥0, 0≤s+t≤200, especially 2≤s+t≤150, and 0≤u≤6.

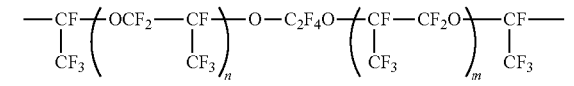

(n = 1 to 100, m = 1 to 100, n + m = 2 to 200)

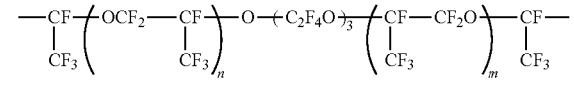

(n = 1 to 100, m = 1 to 100, n + m = 2 to 200)

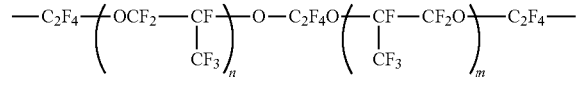

(n = 1 to 100, m = 1 to 100, n + m = 2 to 200)
—CF$_2$O—(C$_2$F$_4$O)$_n$—CF$_2$—
(n = 2 to 200)
—CF$_2$—(O—CF$_2$CF$_2$)$_n$—(OCF$_2$)$_m$—O—CF$_2$—
(n = 1 to 100, m = 1 to 100, n + m = 2 to 200)

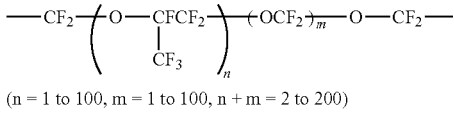

(n = 1 to 100, m = 1 to 100, n + m = 2 to 200)
—CF$_2$CF$_2$—(OCF$_2$CF$_2$CF$_2$)$_n$—OCF$_2$CF$_2$—
(n = 1 to 200)

Herein, m, n and m+n are integers in the ranges specified above.

Preferred examples of the linear fluorinated polymer having formula (1) are shown below.

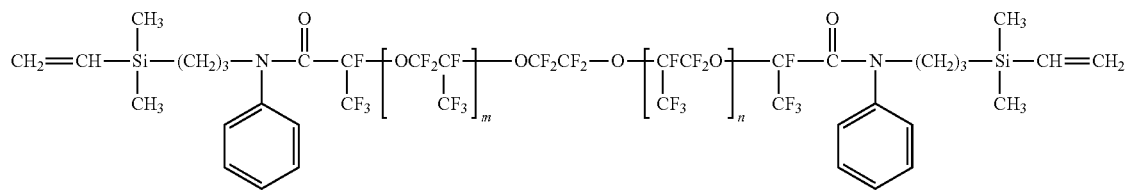

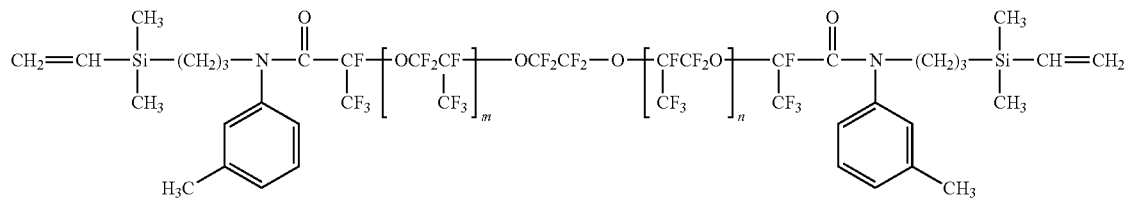

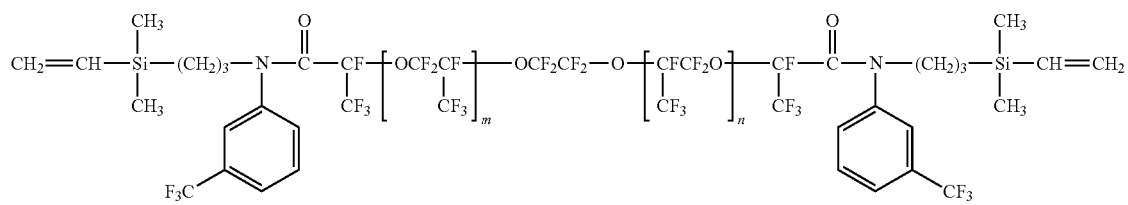

-continued

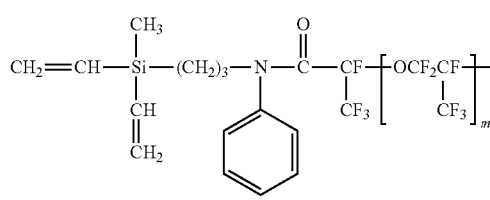 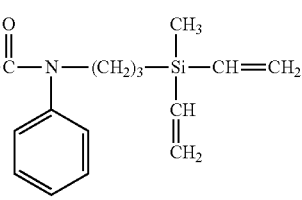

Herein m is an integer of 1 to 100, n is an integer of 1 to 100, and m+n is an integer of 2 to 200.

The linear fluorinated polymer having formula (1) should preferably have a weight average molecular weight (Mw) of 10,000 to 100,000, more preferably 10,000 to 50,000, as measured by gel permeation chromatography (GPC) versus polystyrene standards. A polymer with Mw of less than 10,000 may considerably swell in gasoline and various solvents. In particular, a member having a swelling index in gasoline of more than 6% may be unsatisfactory when it must be gasoline resistant. A polymer with Mw in excess of 100,000 may be too viscous to work.

It is desirable to adjust the Mw of the linear fluorinated polymer having formula (1) to the desired value for the intended application. To this end, a linear perfluoropolyether compound may be subjected to hydrosilylation reaction with an organosilicon compound having two hydrosilyl groups (i.e., SiH groups) in the molecule in a customary manner and conditions, obtaining a product with extended chain, which is ready for use as component (A).

The linear fluorinated polymer as component (A) may be used alone or in admixture of two or more.

Component B

Component (B) is a polyfluoromonoalkenyl compound containing one alkenyl group per molecule and having a perfluoropolyether structure in its backbone. Preferably it is a polyfluoromonoalkenyl compound having the following formula (10).

$$Rf^3—(X')_c—CH=CH_2 \quad (10)$$

In formula (10), X' is $—CH_2—$, $—OCH_2—$, $—CH_2OCH_2—$, or $—CO—NR^6—Y'—$. Y' is $—CH_2—$, an o-, m- or p-dimethylsilylphenylene group of the structural formula (Z'), or a group of the structural formula (Z"), shown below.

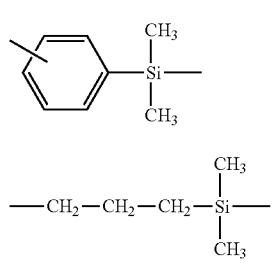

$R^6$ is hydrogen, methyl, phenyl or allyl. $Rf^3$ is a monovalent perfluoropolyether structure-containing group of the following formula:

$$(C_aF_{2a}O)_y—$$

wherein a is an integer of 1 to 6, and y is an integer of 20 to 600, preferably 30 to 400, and more preferably 30 to 200. The subscript c is 0 or 1.

Examples of $Rf^3$ in formula (10) are shown below.

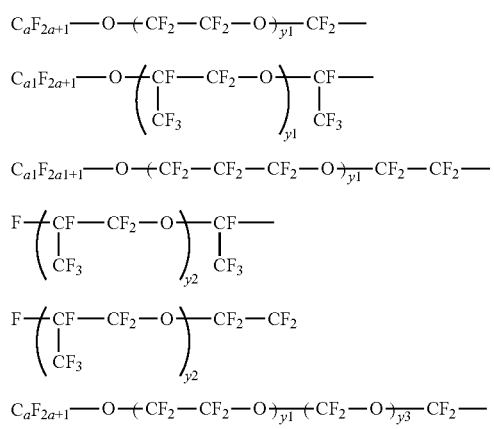

Herein a1 is an integer of 1 to 8, y1 is an integer of 0 to 100, y2 is an integer of 1 to 100, y3 is an integer of 0 to 100, and y1+y3 is an integer of 0 to 100.

Examples of the polyfluoromonoalkenyl compound having formula (10) are shown below.

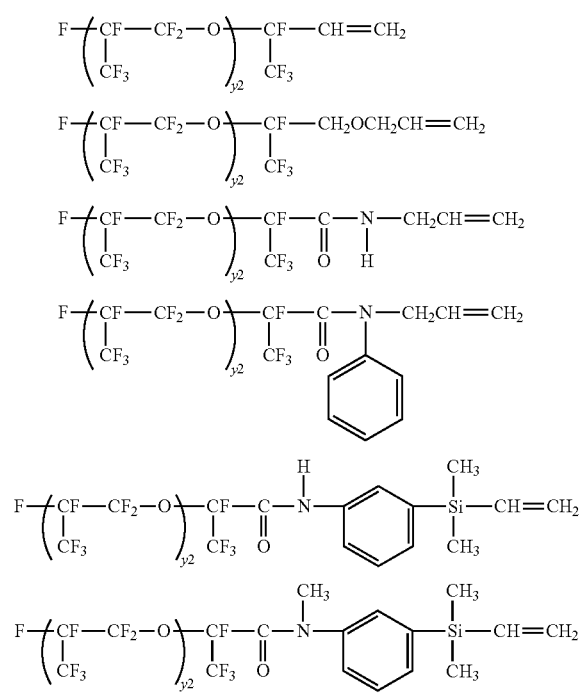

-continued

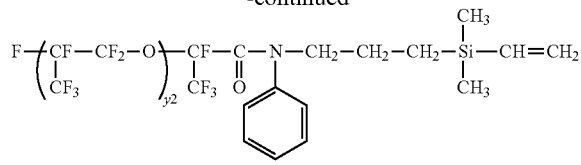

Herein y2 is an integer of 1 to 100.

In the perfluoropolyether based gel composition, the polyfluoromonoalkenyl compound having formula (10) as component (B) is preferably blended in an amount of 1 to 300 parts by weight, more preferably 1 to 150 parts by weight per 100 parts by weight of the linear fluorinated polymer as component (A). With less than 1 pbw of component (B), the cured composition may have a higher crosslinking density, becoming a rubber-like cured mass rather than gel mass. With more than 300 pbw of component (B), the cured composition may have a lower crosslinking density, becoming a liquid rather than gel mass.

Component C

Component (C) is a cyclic organohydrogenpolysiloxane having at least two silicon-bonded hydrogen atoms and at least one perfluoroalkyl group or perfluoropolyether structure-containing group per molecule, represented by the following formula (2). Component (C) functions as a crosslinker and chain extender for component (A). It is recommended from the standpoints of compatibility with and dispersion in components (A) and (B) and cured uniformity, to use an organohydrogenpolysiloxane containing per molecule at least one monovalent fluorinated organic group which is a perfluoroalkyl group or monovalent perfluoropolyether structure-containing group.

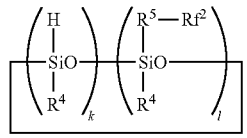

(2)

In formula (2), $Rf^2$ is a perfluoroalkyl group or monovalent perfluoropolyether structure-containing group, $R^4$ is each independently a $C_1$-$C_{20}$ monovalent hydrocarbon group, $R^5$ is a $C_2$-$C_{20}$ divalent hydrocarbon group which may contain an ether bond, amide bond, carbonyl bond, silyl radical or ester bond, k is an integer of 2 to 4, preferably 3 or 4, l is an integer of 1 to 3, preferably 1 or 2, and k+l is 5.

In formula (2), $Rf^2$ is a perfluoroalkyl group or monovalent perfluoropolyether structure-containing group, examples of which include:

perfluoroalkyl groups of the formula:

$C_bF_{2b+1}$— wherein b is an integer of 1 to 20, preferably 2 to 10, and
monovalent perfluoropolyether structure-containing groups of the formula:

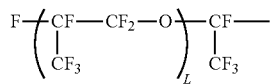

-continued

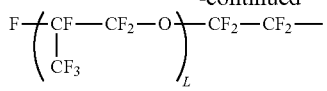

wherein L is an integer of 1 to 200, preferably 2 to 100.

In formula (2), $R^4$ is a $C_1$-$C_{20}$, preferably $C_1$-$C_{12}$ monovalent hydrocarbon group. Suitable substituted or unsubstituted monovalent hydrocarbon groups include alkyl groups such as methyl, ethyl, propyl, isopropyl, butyl, isobutyl, tert-butyl, pentyl, hexyl, octyl and decyl, cycloalkyl groups such as cyclopentyl, cyclohexyl and cycloheptyl, alkenyl groups such as vinyl, allyl, propenyl, isopropenyl, butenyl and hexenyl, aryl groups such as phenyl, tolyl, xylyl, and naphthyl, aralkyl groups such as benzyl, phenylethyl and phenylpropyl, and substituted forms of the foregoing in which some hydrogen atoms are substituted by chlorine, cyano or the like, such as chloromethyl, chloropropyl and cyanoethyl. Those hydrocarbon groups free of aliphatic unsaturation are preferred.

$R^5$ is a divalent linker, specifically $C_2$-$C_{20}$ divalent hydrocarbon group which may contain an ether bond, amide bond, carbonyl bond, silyl radical or ester bond. Suitable linkers include alkylene groups, arylene groups, and combinations thereof, which may be separated by at least one ether bond oxygen atom (—O—), amide bond (—NRCO—), carbonyl bond (—CO—), or ester bond (—COO—), while linkers of 2 to 12 carbon atoms are preferred. In the amide bond (—NRCO—), R is hydrogen, $C_1$-$C_4$ alkyl or phenyl. Examples of $R^5$ are shown below.

—CH$_2$CH$_2$—
—CH$_2$CH$_2$CH$_2$—
—CH$_2$CH$_2$CH$_2$—O—CH$_2$—
—CH$_2$CH$_2$CH$_2$—NH—CO—
—CH$_2$CH$_2$CH$_2$—N(Ph)-CO—
—CH$_2$CH$_2$—Si(CH$_3$)$_2$—CH$_2$CH$_2$CH$_2$—N(Ph)-CO—
—CH$_2$CH$_2$—Si(CH$_3$)$_2$-Ph'-N(CH$_3$)—CO—
—CH$_2$CH$_2$CH$_2$—N(CH$_3$)—CO—
—CH$_2$CH$_2$CH$_2$—N(CH$_2$CH$_3$)—CO—
—CH$_2$CH$_2$CH$_2$—N(CH(CH$_3$)$_2$)—CO—
—CH$_2$CH$_2$CH$_2$—N(C(CH$_3$)$_3$)—CO—
—CH$_2$CH$_2$CH$_2$—O—CO—

Of these, —CH$_2$CH$_2$—Si(CH$_3$)$_2$-Ph'-N(CH$_3$)—CO— is most preferred.

It is critical that the organosilicon compound as component (C) be cyclic and have 5 silicon atoms. This structure contributes to resistance to acid (conc. sulfuric acid and conc. nitric acid), especially resistance to nitric acid.

Suitable organosilicon compounds include cyclic siloxane structure-bearing organosilicon compounds shown by the following formulae. The organosilicon compounds may be used alone or in admixture.

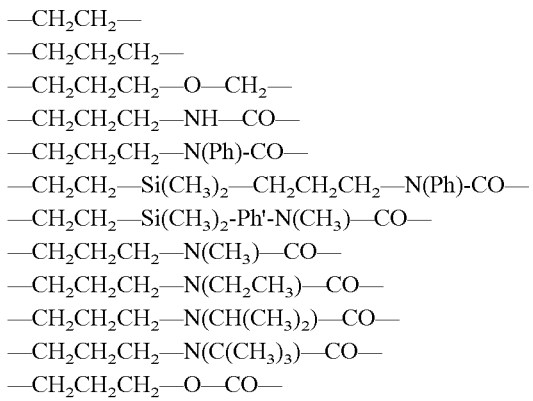

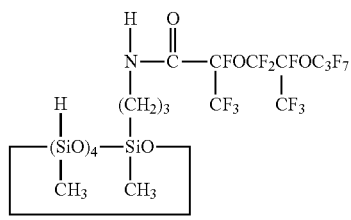

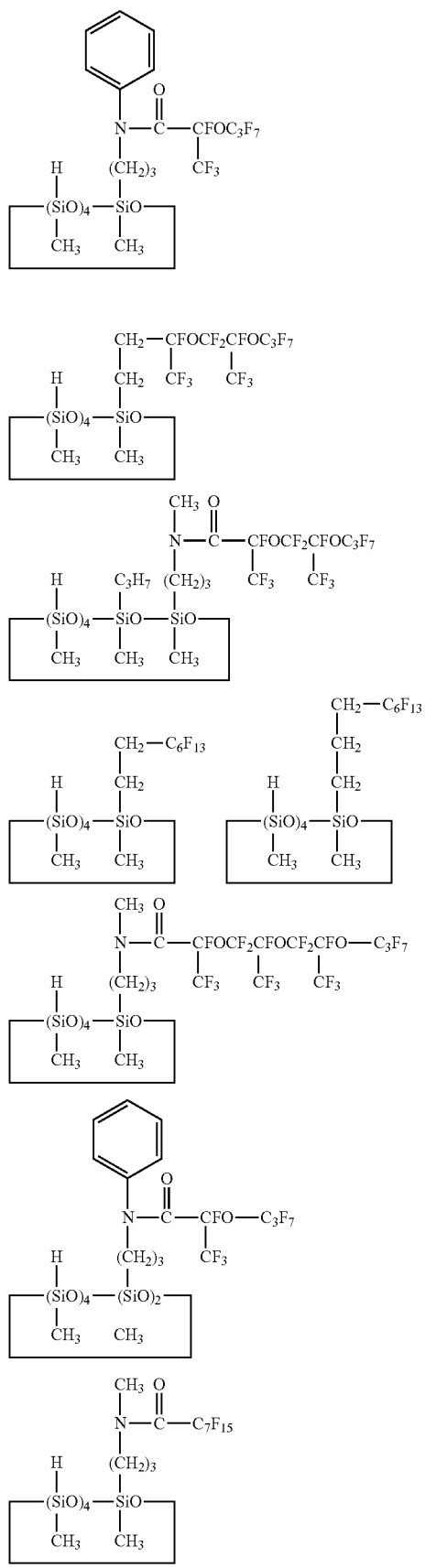

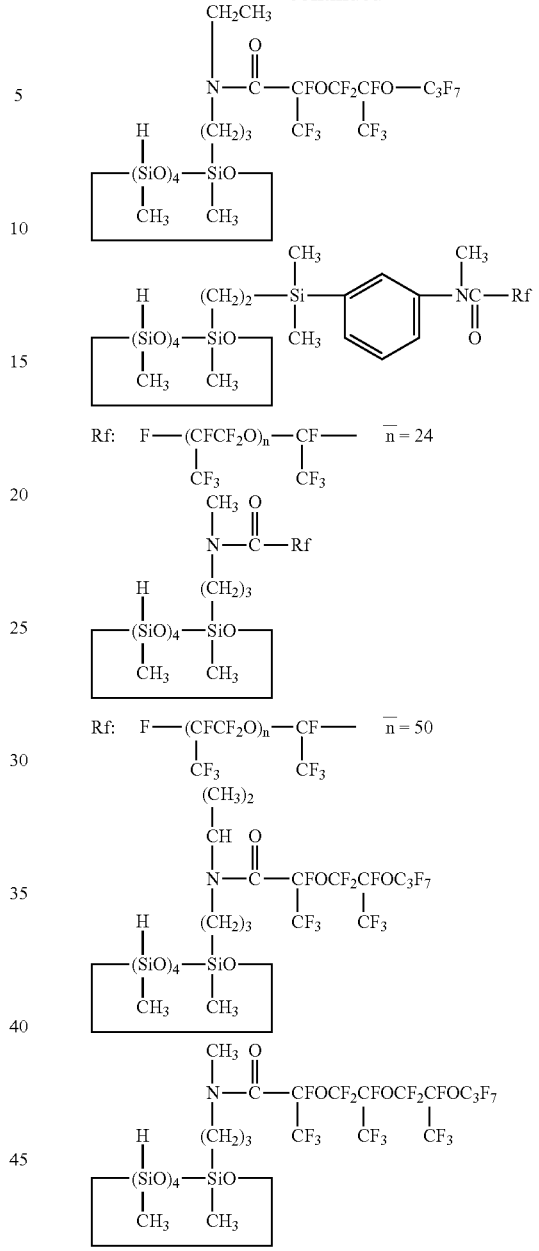

As component (C), those compounds of the following formula are most preferred.

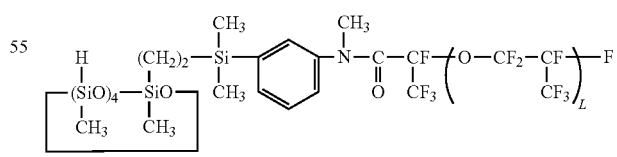

Herein L is as defined above.

Component (C) is used in an effective amount for curing of components (A) and (B), preferably an amount to provide 0.2 to 2 moles, more preferably 0.5 to 1.5 moles of hydrosilyl (SiH) groups in component (C) per mole of alkenyl groups in components (A) and (B) combined. If less hydrosilyl (SiH) groups are available, then the degree of crosslinking is insufficient, resulting in undercure. With too much hydrosilyl groups, expansion may occur during the curing step.

Component D

Component (D) is a hydrosilylation reaction catalyst. It promotes addition reaction between alkenyl groups in components (A) and (B) and hydrosilyl groups in component (C). The hydrosilylation catalysts are generally noble metal compounds, which are expensive. Of these, platinum and platinum compounds are often used because they are relatively readily available.

Suitable platinum compounds include chloroplatinic acid, complexes of chloroplatinic acid with olefins such as ethylene, complexes of chloroplatinic acid with alcohols and vinylsiloxanes, and metallic platinum on silica, alumina and carbon carriers. Suitable platinum group metal catalysts other than the platinum compounds include rhodium, ruthenium, iridium and palladium compounds, such as, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$.

The hydrosilylation catalyst may be used in any desired amount, typically a catalytic amount. Usually, the catalyst is used in such an amount as to give 0.1 to 100 ppm of platinum group metal based on the total weight of components (A), (B), (C) and (E).

Component E

Component (E) is at least one perfluoropolyether compound which is selected from the general formulae (3) to (5):

$$A\text{-}O\text{---}(CF_2\text{---}CF_2\text{---}CF_2\text{---}O)_d\text{-}A \quad (3)$$

wherein A is a group: $C_eF_{2e+1}$—, d is an integer of 1 to 500, e is an integer of 1 to 3,

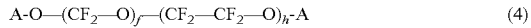

$$A\text{-}O\text{---}(CF_2\text{---}O)_f\text{---}(CF_2\text{---}CF_2\text{---}O)_h\text{-}A \quad (4)$$

wherein A is as defined above, f and h each are an integer of 1 to 300,

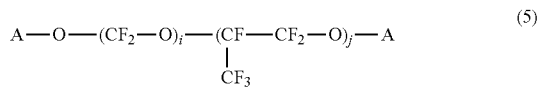

$$A\text{---}O\text{---}(CF_2\text{---}O)_i\text{---}(CF\text{---}CF_2\text{---}O)_j\text{---}A \\ \qquad\qquad\qquad\qquad\;\; | \\ \qquad\qquad\qquad\qquad CF_3 \quad (5)$$

wherein A is as defined above, i and j each are an integer of 1 to 300.

Although the perfluoropolyether compound (E) is optional, component (E) is effective for endowing the composition with chemical resistance, solvent resistance and low-temperature properties without detracting from physical properties. Particularly when component (E) is blended in a perfluoropolyether based gel composition, improvements in low-temperature properties such as a lowering of glass transition temperature are achieved.

Component (E) is preferably blended in an amount of 0 to 300 parts, more preferably 10 to 270 parts, and even more preferably 50 to 250 parts by weight per 100 parts by weight of components (A) and (B) combined. If component (E) is in excess of 300 pbw, it may bleed out of the cured gel with the lapse of time. Component (E) may be used alone or in admixture of two or more.

Other Components

In addition to components (A) to (E) defined above, any of prior art well-known additives may be added to the composition as long as the benefits of the invention are not impaired. One typical additive is a regulator for the hydrosilylation reaction catalyst. Suitable regulators include acetylene alcohols such as 1-ethynyl-1-hydroxycyclohexane, 3-methyl-1-butyn-3-ol, 3,5-dimethyl-1-hexyn-3-ol, 3-methyl-1-pentyn-3-ol, and phenyl butynol, 3-methyl-3-penten-1-yne, 3,5-dimethyl-3-hexen-1-yne, cyclic polymethylvinylsiloxane compounds, and organophosphorus compounds. The addition of such a regulator ensures a good compromise between curing reactivity and storage stability.

Another additive is an inorganic filler. Suitable fillers include powdered metal oxides such as iron oxide, zinc oxide, titanium oxide, and alumina as well as calcium carbonate, magnesium carbonate, zinc carbonate, carbon black, fumed silica, wet silica, ground silica, and diatomaceous earth. By adding the filler to the composition, the hardness and mechanical strength of the cured composition may be adjusted. Besides, ion exchange resins such as hydrotalcite, hollow inorganic fillers, and rubbery spherical fillers are also useful.

These optional components may be added in any desired amounts as long as the benefits of the invention are not impaired.

Cured Mass

The perfluoropolyether based gel composition may be cured into a gel mass (known as perfluoropolyether gel) which has heat resistance, chemical resistance, solvent resistance, water/oil repellency, weatherability, and in particular, improved acid resistance so that it may find use in a variety of applications.

Specifically the perfluoropolyether based gel composition is formulated by blending 100 parts by weight of component (A) with 1 to 300 parts by weight of component (B), an amount of component (C) to provide 0.2 to 2 moles of hydrosilyl (SiH) groups per mole of alkenyl groups in components (A) and (B) combined, and an amount of component (D) to provide 0.1 to 100 ppm of platinum based on the total weight of components (A), (B), (C) and (E). It is optional to add 0 to 300 parts by weight of component (E) per 100 parts by weight of components (A) and (B) combined for the purpose of lowering the glass transition temperature.

The composition is applied by any well-known techniques, for example, cast into a suitable mold, coated onto a suitable substrate, or laminated before the composition is cured into a gel mass. Usually the composition may be cured simply by heat treatment at a temperature of 60 to 150° C. for about 30 to 180 minutes.

The cured gel mass is typically a gel material having a penetration of 1 to 200 as measured by the consistency test method (¼ cone) according to JIS K 2220 (or ASTM D-1403) and a glass transition temperature of −50° C. or lower.

A gel product comprising the cured gel mass is suited for use in automobiles, chemical plants, inkjet printers, semiconductor fabrication lines, analyzers, scientific instruments, medical instruments, aircraft, fuel cells, and the like.

Specifically, the gel product comprising the cured gel mass is suited for use as automobile parts, chemical plant parts, inkjet printer parts, semiconductor fabrication line parts, analyzer parts, scientific instrument parts, medical instrument parts, moisture-proof coatings for electric and electronic components, sensor potting agents, fuel cell sealants, and the like. More specifically, when the gel product is used as coatings for electric and electronic components and sensor potting agents, it is advantageously used in gas pressure sensors, hydraulic pressure sensors, temperature sensors, moisture sensors, rotation sensors, G sensors, timing sensors, air flow meters, electronic circuits, semiconductor modules, and various control units.

When the cured mass is used as potting agents, coating agents or the like, any well-known primers may be used in combination for improving the adhesion or bond of the cured mass to the substrate. Since the primer layer prevents penetration of chemicals or solvents through the substrate interface, the part as a whole is improved in acid resistance, chemical resistance and solvent resistance. Suitable primers include silane based primers, typically silane coupling agent based primers, organohydrogenpolysiloxane based primers, synthetic rubber based primers, acrylic resin based primers, urethane resin based primers, and epoxy resin based primers.

In a preferred embodiment, the cured mass of the curable perfluoropolyether based gel composition shows a residual solid content of at least 90% by weight after it is immersed in conc. sulfuric acid (98%) at 40° C. for 1,000 hours, and the mass shows a penetration change of up to 25 after it is immersed in conc. nitric acid (60%) at 40° C. for 2,000 hours. If the residual solid content is less than 90%, long-term reliability may be lost as demonstrated by leakage through the sealed portion and corrosion of the protected substrates or electric/electronic parts. If the penetration change is more than 25, reliability may be lost as demonstrated by leakage through the sealed portion due to peeling from the substrate, and malfunction of the protected electric/electronic parts.

The acid resistance effect demonstrated by a residual solid content of at least 90% after conc. sulfuric acid immersion and a penetration change of up to 25 after conc. nitric acid immersion is achieved by using the fluorinated polymer of specific molecular structure (A) as the base polymer and combining it with components (B) to (D) and optionally (E) to formulate a gel composition.

EXAMPLE

Examples of the invention are given below by way of illustration and not by way of limitation. All parts and % are by weight.

Examples 1, 2 and Comparative Examples 1 to 3

Perfluoropolyether based gel compositions as shown in Table 1 were prepared using the following materials.

Polymer A

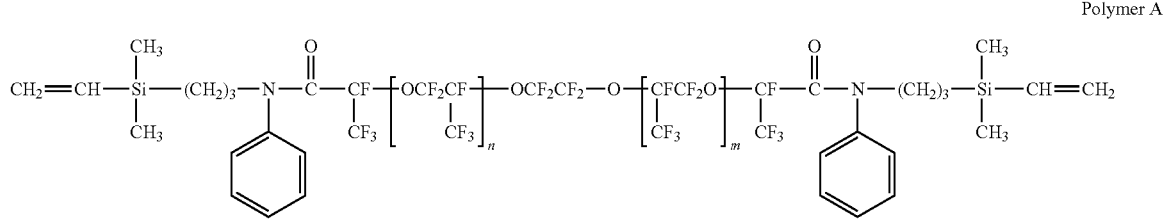

An average of m+n is 95.

Polymer B

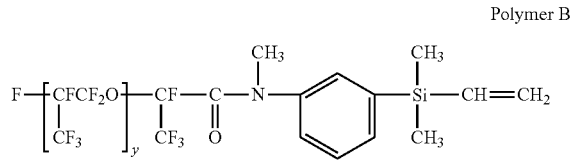

An average of y is 24.

Polymer C

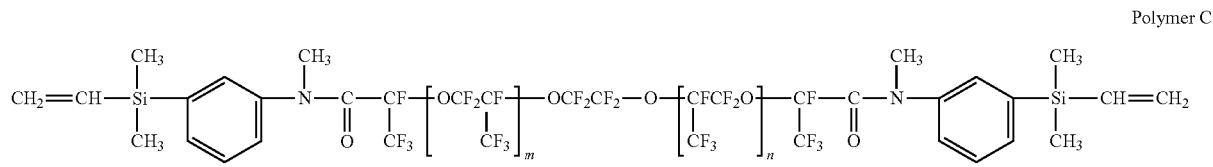

An average of m+n is 97.

Polymer D

CF$_3$O—(CF$_2$CF$_2$CF$_2$O)$_d$—C$_2$F$_5$ d=27

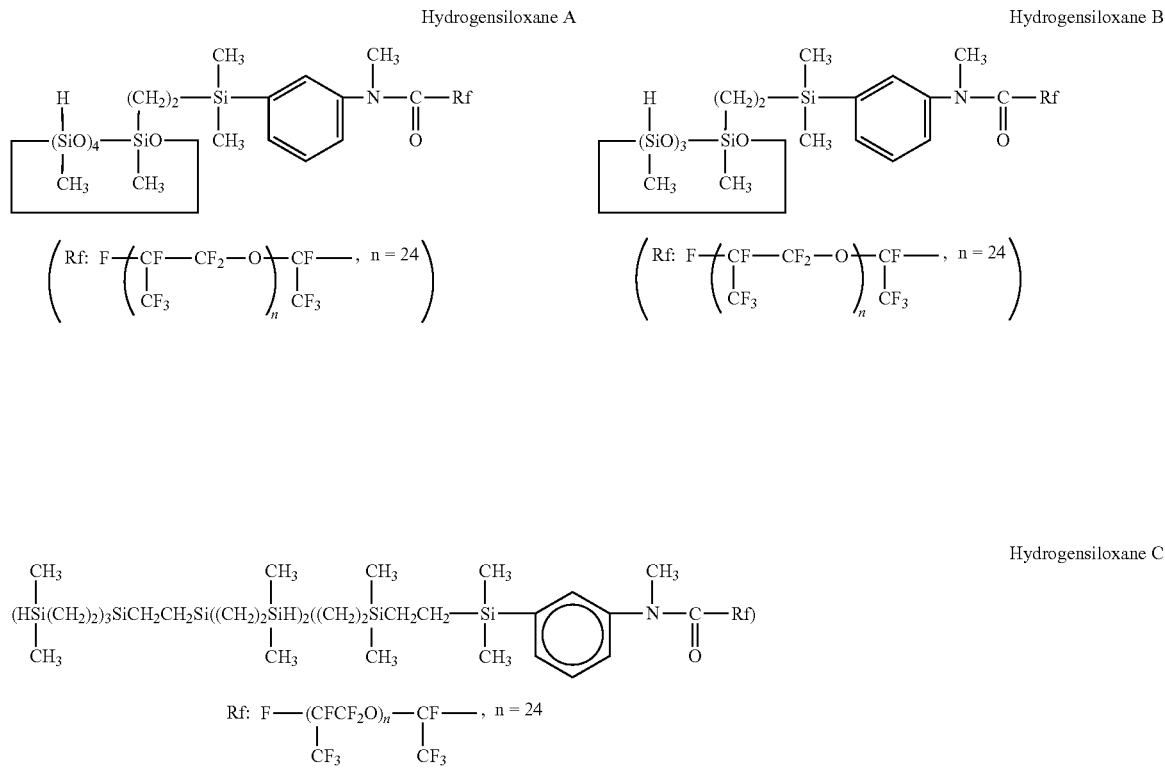

Hydrogensiloxane A

Hydrogensiloxane B

Hydrogensiloxane C

Curing Catalyst:

toluene solution of platinum-divinyltetramethyldisiloxane complex (platinum content 0.5%)

Cure Regulator:

50% toluene solution of ethynyl cyclohexanol

Each of the gel compositions was cured at 150° C. for 1 hour. The cured gel mass was measured for hardness or penetration according to JIS K 2220 and tested for acid resistance by the following methods. The results are also shown in Table 1.

Acid Resistance Test/Conc. Sulfuric Acid (Weight Change)

A glass vial of 32 mm diameter×15 mm was charged with 20 g of the composition, which was cured at 150° C. for 1 hour. The sample was immersed in 98% conc. sulfuric acid at 40° C. for 1,000 hours. A weight change before and after immersion was measured.

Acid Resistance Test/Conc. Sulfuric Acid (Appearance)

A glass vial of 32 mm diameter×15 mm was charged with 20 g of the composition, which was cured at 150° C. for 1 hour. The sample was immersed in 98% conc. sulfuric acid at 40° C. for 1,000 hours. The outer appearance of the sample after immersion was rated according to the following criterion.

○: no change

Δ: little change (partly dissolved)

x: marked change (fully dissolved)

Acid Resistance Test/Conc. Nitric Acid (Physical Change)

A glass vial of 32 mm diameter×15 mm was charged with 20 g of the composition, which was cured at 150° C. for 1 hour. The sample was immersed in 60% conc. nitric acid at 40° C. for 2,000 hours. A penetration was measured before and after immersion.

TABLE 1

| | | Example 1 | Example 2 | Comparative Example 1 |
|---|---|---|---|---|
| Formulation (parts by weight) | Polymer A | 51 | 29 | 39 |
| | Polymer B | 49 | 21 | 11 |
| | Polymer C | | | |
| | Polymer D | | 50 | 50 |
| | Curing catalyst | 0.06 | 0.06 | 0.06 |
| | Cure regulator | 0.12 | 0.12 | 0.12 |
| | Hydrogensiloxane A | 19.7 | 9.5 | |
| | Hydrogensiloxane B | | | 12.5 |
| | Hydrogensiloxane C | | | |
| Penetration (as heat cured @150° C./1 hr) | | 61 | 58 | 59 |
| Acid resistance test in sulfuric acid @40° C./1000 hr | Weight change | 0% | 0% | 0% |
| | Appearance | ○ | ○ | ○ |
| Acid resistance test in nitric acid @40° C./2000 hr | Penetration | 39 | 42 | 18 |
| | Penetration change after test | 22 | 16 | 41 |

TABLE 2

|  |  | Comparative Example 2 | Comparative Example 3 |
|---|---|---|---|
| Formulation (parts by weight) | Polymer A | 26 | |
|  | Polymer B | 24 | 20 |
|  | Polymer C |  | 30 |
|  | Polymer D | 50 | 50 |
|  | Curing catalyst | 0.06 | 0.06 |
|  | Cure regulator | 0.12 | 0.12 |
|  | Hydrogensiloxane A |  | 9.1 |
|  | Hydrogensiloxane B |  |  |
|  | Hydrogensiloxane C | 12.9 |  |
| Penetration (as heat cured @150° C./1 hr) |  | 60 | 58 |
| Acid resistance test in sulfuric acid @40° C./1000 hr | Weight change | −100% | −100% |
|  | Appearance | X | X |
| Acid resistance test in nitric acid @40° C./2000 hr | Penetration | 36 | 38 |
|  | Penetration change after test | 24 | 20 |

Japanese Patent Application No. 2014-074342 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable perfluoropolyether based gel composition comprising
   (A) a linear fluorinated polymer containing at least two alkenyl groups per molecule, represented by the formula (1):

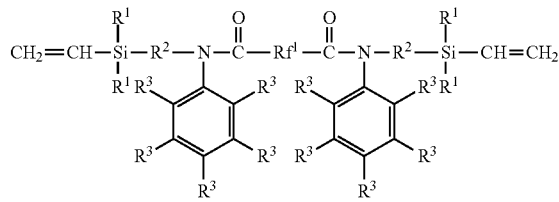

(1)

wherein $R^1$ is each independently vinyl or $C_1$-$C_4$ alkyl, $R^2$ is each independently $C_1$-$C_6$ alkylene, $R^3$ is each independently hydrogen or optionally fluorinated $C_1$-$C_4$ alkyl, and $Rf^1$ is a perfluoroalkylene group or divalent perfluoropolyether structure-containing group, (B) a polyfluoromonoalkenyl compound containing one alkenyl group per molecule and having a perfluoropolyether structure in its backbone, (C) a cyclic organohydrogenpolysiloxane having at least two silicon-bonded hydrogen atoms and at least one perfluoroalkyl group or perfluoropolyether structure-containing group per molecule, represented by the formula (2):

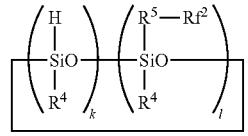

(2)

wherein $Rf^2$ is a perfluoroalkyl group or monovalent perfluoropolyether structure-containing group, $R^4$ is each independently a $C_1$-$C_{20}$ monovalent hydrocarbon group, $R^5$ is a $C_2$-$C_{20}$ divalent hydrocarbon group which may contain an ether bond, amide bond, carbonyl bond, silyl radical or ester bond, k is an integer of 2 to 4, l is an integer of 1 to 3, and k+l is 5, and (D) a hydrosilylation reaction catalyst.

2. The curable perfluoropolyether based gel composition of claim 1 wherein component (C) is a hydrogenpolysiloxane of the following formula:

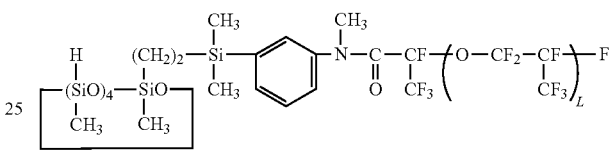

wherein L is an integer of 1 to 200.

3. The curable perfluoropolyether based gel composition of claim 1, further comprising (E) at least one perfluoropolyether compound selected from the general formulae (3) to (5):

$$A\text{-}O\text{---}(CF_2\text{---}CF_2\text{---}CF_2\text{---}O)_d\text{-}A \quad (3)$$

wherein A is a group: $C_eF_{2e+1}$---, d is an integer of 1 to 500, e is an integer of 1 to 3, $$A\text{-}O\text{---}(CF_2\text{---}O)_f\text{---}(CF_2\text{---}CF_2\text{---}O)_h\text{-}A \quad (4)$$

wherein A is as defined above, f and h each are an integer of 1 to 300,

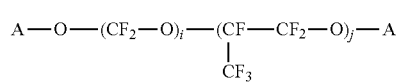

(5)

wherein A is as defined above, i and j each are an integer of 1 to 300.

4. The curable perfluoropolyether based gel composition of claim 1 which cures into a mass having a penetration of 1 to 200 according to JIS K 2220 or ASTM D-1403.

5. The curable perfluoropolyether based gel composition of claim 1 which cures into a mass that shows a residual solid content of at least 90% by weight after it is immersed in conc. sulfuric acid (98%) at 40° C. for 1,000 hours, and a penetration change of up to 25 after it is immersed in conc. nitric acid (60%) at 40° C. for 2,000 hours.

6. A gel product comprising a cured mass of the curable perfluoropolyether based gel composition of claim 1.

7. The gel product of claim 6 which is suited for use in automobiles, chemical plants, inkjet printers, semiconductor fabrication lines, analyzers, scientific instruments, medical instruments, aircraft, or fuel cells.

\* \* \* \* \*